United States Patent [19]
Hotaling

[11] Patent Number: 5,358,776
[45] Date of Patent: Oct. 25, 1994

[54] LIGHTWEIGHT AEROGEL REFLECTOR

[75] Inventor: Steven P. Hotaling, Syracuse, N.Y.

[73] Assignee: The United States of America as represented by the Secretary of the Air Force, Washington, D.C.

[21] Appl. No.: 830,010

[22] Filed: Jan. 31, 1992

[51] Int. Cl.$^5$ .......................................... B32B 17/00
[52] U.S. Cl. ...................... 428/304.4; 428/306.6; 428/307.3; 428/307.7; 428/312.2; 428/312.6; 428/429; 428/446; 428/469; 428/472; 428/701; 428/702; 359/584
[58] Field of Search ............ 428/429, 632, 446, 304.4, 428/306.6, 307.3, 307.7, 312.2, 312.6, 469, 472, 701, 702; 359/577, 580, 581, 582, 584, 585; 427/162, 240, 248.1, 250, 255.2, 255.3, 292, 425

[56] References Cited
U.S. PATENT DOCUMENTS

| | | | |
|---|---|---|---|
| 2,647,441 | 8/1953 | Boydston | 359/584 |
| 3,601,471 | 8/1969 | Seddon | 359/584 |
| 4,477,580 | 10/1984 | Fleming, Jr. | 501/12 |
| 4,670,338 | 6/1987 | Clemino | 428/312.6 |
| 4,672,023 | 6/1987 | Leung | 427/240 |
| 4,806,328 | 2/1989 | Van Lierop | 423/338 |
| 4,826,271 | 5/1989 | Takahashi et al. | 350/6.8 |
| 4,894,357 | 1/1990 | Hupe et al. | 502/233 |
| 4,898,604 | 2/1990 | Sauerwein | 65/18.1 |
| 4,979,802 | 12/1990 | Ichikawa | 359/584 |
| 5,007,689 | 4/1991 | Kelly | 359/580 |

Primary Examiner—Ellis P. Robinson
Assistant Examiner—Timothy M. Speer
Attorney, Agent, or Firm—Donald J. Singer; Thomas C. Stover

[57] ABSTRACT

A method for fabricating an LD aerogel reflector, including large space-based mirrors is provided wherein, a) an LD silica aerogel substrate at densities between 10–500 mg/cc is prepared, b) the surface of such aerogel substrate is polished to an optical quality surface, c) a dielectric planarization layer of SiO$_2$ is applied to the so-polished substrate surface and d) one or more reflective layers (of e.g. Al/Y$_2$O$_3$ coatings) are deposited on the planarization layer to form a lightweight reflector which includes an LD aerogel substrate that was not available before the invention hereof. Such LD aerogel substrates of the invention are lighter than ULE glass substrates for mirrors by a factor of up to 6 or more. Accordingly, given the payload constraints of launch vehicles, much larger reflectors made according to the invention, can be deployed in space than previously possible with heavier prior art mirror substrates.

7 Claims, 3 Drawing Sheets

LIGHTWEIGHT AEROGEL REFLECTOR

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a lightweight aerogel reflector particularly one having a reflective layer on a low-density aerogel substrate and method for manufacturing same.

2. The Prior Art

Optical systems including space-based optical system often have need for large reflectors, including mirrors. Presently available under current ULE (ultra low expansion) glass technology, a mirror substrate with a density of 2.2 gms/cc is obtainable, which can result in mirrors weighing hundreds of pounds, which limits the size of the optical system according to launch payload constraints. If a lower density mirror substrate can be fabricated, larger reflectors and optical systems could be launched and deployed in space for improved observation of the skies and of the Earth below.

There has now been discovered a method for manufacture of lightweight reflectors having a substrate density considerably below the 2.2 gms/cc of the above prior art per ULE glass technology. In fact the present invention provides reflector substrates with densities approaching a full order of magnitude below present-day ULE glass mirrors to as low as 0.01 gms/cc or as expressed herein, 10 mg/cc.

The present invention employs a reflector substrate of low density or LD. By a low density or LD substrate as used herein, is meant one with a density of 10–500 mg/cc.

Such aerogel is typlified by high porosity and thus a rough surface not apparently suitable for optical substrate applications. In fact no prior art literature was found on low-density aerogel optical substrate applications. However, the present invention provides a method for adapting LD aerogels as suitable substrates for lightweight optical applications including mirrors.

SUMMARY OF THE INVENTION

Broadly the present invention provides a method for fabricating a reflector from LD aerogels comprising, a) preparing an LD aerogel substrate at densities between 10–500 mg/cc, b) polishing the surface of the aerogel substrate, c) applying a dielectric planarization layer to the so-polished aerogel surface and d) depositing one or more reflective layers on the planarization layer to provide a lightweight reflector which includes an LD aerogel substrate.

The invention also provides a LD aerogel reflector comprising, a) a substrate of LD aerogel at densities between 10–500 mg/cc, b) the surface of the substrate being polished, c) a dielectric planarization layer applied to the so-polished surface and d) one or more reflective layers coated on the planarization layer.

BRIEF DESCRIPTION OF THE DRAWINGS

The invention will become more apparent from the following detailed specification and drawings in which.

DESCRIPTION OF PREFERRED EMBODIMENTS

Figure 1:
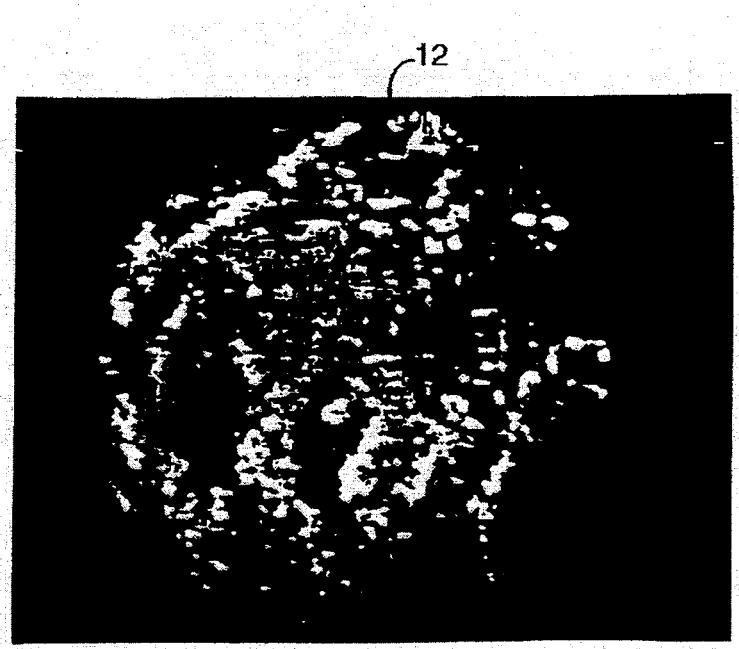
FIG. 1 is an elevation view of unpolished silica aerogel before use as a substrate in the reflector of the present invention.

Referring in more detail to the drawings, an LD silica aerogel substrate precursor 10, as shown in FIG. 1, is prepared. The method of preparing such precursor has recently been carried out by others and by itself does not define the novelty of the present invention. The preparation of such aerogel includes the hydrolysis and condensation of tetraethoxysilane (TEOS) and/or tetramethoxysilane (TMOS) to produce gels which are then supercritically extracted to a low-density silicon glass network. This single-step solgel process has been used for several years in producing materials with densities ranging from 20 to 1100 mg/cc. This method is suitable for preparing LD aerogels employed in the present invention. However, such method requires high temperatures, e.g. 400° C. and pressures, e.g. 300 bars and certain precautions may be required.

The present invention employs an aerogel preferably made by a two-step extraction process. The two-step process differs from a conventional solgel process in that it generally proceeds at lower temperatures and pressures than the above one-step process and instead of requiring an extremely dilute solution to gel as in the single-step reaction, a partially hydrolyzed, partially condensed polysilicate mixture is prepared from which the alcohol is replaced as the solvent and then this nonalcoholic solvent is supercritically extracted.

That is, the solvent replacement technique employs liquid carbon dioxide, $CO_2$, to purge the system of the alcohols and then supercritically extracts the replacement solvent, i.e. heats the system to a relatively low 40° C., (and e.g. 40 bars pressure) to drive off the $CO_2$. This leaves a very low density silicon dioxide network or aerogel, with densities ranging from 3 to 900 mg/cc.

In a more specific example, aerogel mirror substrates of the invention are fabricated using the above technology by first preparing a condensed silica oil by reacting TMOS with a sub-stoichiometric amount of water in methanol, under acidic conditions, with the following molar ratios:

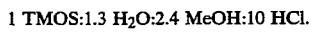

1 TMOS:1.3 $H_2O$:2.4 MeOH:10 HCl.

This mixture is then distilled, removing much of the methanol and leaving the silica oil (which includes the TMOS). The oil is then hydrolyzed:

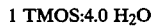

1 TMOS:4.0 $H_2O$

This reaction is done in a pyrex glass mold in the presence of a non-alcoholic basic diluent ($NH_4OH$). Gel times vary from 12–72 hours. The silica aerogel is obtained from this "alcogel" by using liquid carbon dioxide to purge the alcogel of alcohol and replace it with such liquid carbon dioxide (which keeps the aerogel pores open). Thereafter heat is applied to raise the temperature of such aerogel to about 40° C., to apply supercritical triple point extraction ($CO_2$ phase diagram) to drive off such replacement solvent in the autoclave. The temperature is ramped (up to about 40° C.) while pressure is controlled and when finished, the autoclave (and the dried porous aerogel) is purged with dry nitrogen. The aerogel mirror substrate is then removed from the mold for polishing, coating and testing per the invention.

For more information on the above two-step extraction process or solvent replacement technique, in preparing aerogels, see an article by Laurence Hrubish and Thomas Tillotson in a book entitled "Better Ceramics through Chemistry Part IV," *Materials Research Society*, MRS Press, Pittsburgh, Pa., 1991, which article is incorporated herein by reference.

Thus to summarize, the aerogel starts as a sol, a coloidal suspension of solid particles in a liquid solvent. A catalyst is introduced to expedite gelation and after some aging time, the liquid is extracted from the gel. The liquid solvent is extracted in a two-step or solvent replacement method in which the solvent is replaced in the gel by a liquid having a lower critical temperature, e.g. liquid $CO_2$, followed by supercritical extraction of the $CO_2$ in a critical point, drying unit such as an autoclave.

The aerogel precursor 10, as indicated in FIG. 1, has high porosity, densities as low as 10 mg/cc and less than 1% solids content. The rough surface 12 (per FIG. 1 and FIG. 3 at section A) of such precursor is not yet suitable as an optical substrate. However, such aerogel substrate precursor is improved, according to the invention, by polishing the surface thereof, e.g. by a lapping process. The technique for polishing such precursor, however, is different from that of polishing a glass sample. Liquids employed in polishing glass samples would dissolve the aerogel material. Accordingly, instead of water a freon (dichlorodifloromethylene) spray is used during the lapping process. A minimum of such spray is employed and it is applied directly onto the lapping paper rather than onto the aerogel surface to minimize an over-wetting effect (which can dissolve the aerogel material).

The lapping is performed on a diamond or sapphire lapping film with rms roughness ranging from 64 to 1 microns. These lapping films are generally used for polishing fiberoptical cables after cleaving and are commercially available.

Figure 2:
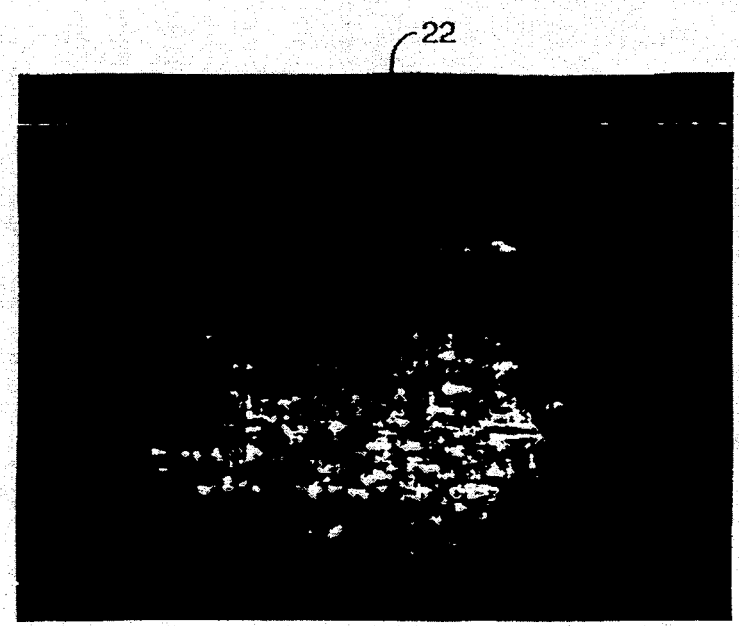
FIG. 2 is an elevation view of the aerogel sample of FIG. 1, after polishing for use as a substrate in the reflector of the present invention.
Figure 3:
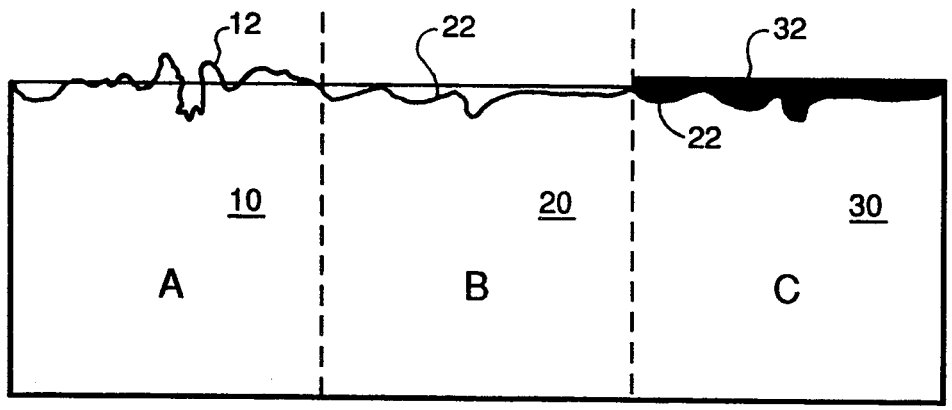
FIG. 3 is a sectional elevational schematic view of an aerogel substrate that has been polished and planarized in stages per the invention.

FIG. 1, as noted above, shows a simulated photomicrograph of a 450 mg/cc aerogel sample prior to polishing. The magnification is 64× (bar=8 microns) and there is an obviously rough surface topography. FIG. 2 illustrates the same sample of aerogel after one minute of polishing with 64 micron lapping paper followed by one minute at 40 microns using a circular lapping motion. And FIG. 8 polishing motions are applied in the following sequence: 30 seconds at 40 microns, 1 minute at 15 microns, 1 minute at 9 microns, 2 minutes at 3 microns, 3 minutes at 1 micron and 2 minutes at 0.3 microns, 1 minute at 0.5 microns and 2 minutes at 0.3 microns. By such polishing, the rough aerogel substrate precursor 10 of FIG. 1 is polished to a relatively smooth aerogel substrate 20 having a polished surface 22, that is of fine grain porosity and of high surface quality, as shown in FIG. 2 and FIG. 3 at section B. That is, the aerogel substrate is polished sufficiently that a planarization layer may rest smoothly thereon.

Having obtained the polished aerogel substrate, the next steps are the coating steps, i.e. applying a dielectric planarization layer to the substrate surface and then depositing or coating a reflective layer on the planarization layer, to provide the lightweight reflector of the invention. However, before describing the next two coating steps, it is noted that the invention also includes additional or alternative steps to polishing the rough aerogel substrate precursor 10 of FIG. 1.

In another alternative procedure within the scope of the invention, the rough substrate precursor 10 of FIG. 1, can be subjected to optical cleaving with less polishing required, before the planarization step noted above and more fully described below.

Also in another embodiment of the method of the invention, to achieve near optical quality aerogel surfaces, a precise mold can be employed, for example, an LODTM (large optical diamond turning machine) can serve to fabricate a solgel mold to near net shape, with single or low tens of Angstrom rms roughness. The resulting aerogel shape can then be very complex, (e.g. aspherical) and of high quality requiring less polishing and machining followed by planarization and coating.

Continuing on with the planarization and coating steps embodying the method of the invention; having obtained the polished aerogel substrate, e.g. as shown in FIGS. 2 and 3, it is then planarized with $SiO_2$ using PECVD (Plasma Enhanced Chemical Vapor Deposition) and thermal evaporation techniques. The PECVD is performed, e.g. in a Technics Series 900 RF reactor using a silane/nitrous oxide plasma. In one example, the substrate temperature was 240° C. and RF power was 34 watts. The film deposition rate was determined by ellipsometry (on co-deposited Silicon wafers) to be 506 Angstroms/minute. In this example an Edwards evaporator was employed to deposit the $SiO_2$ planarization layer at an initial chamber pressure of $8 \times 10^{-7}$ mbar. The substrate temperature was 50°-110° C. (as measured by a thermocouple within 1 cm of the substrate). When using both the PECVD and evaporation deposition chambers, the substrate was outgassed under high vacuum for more than 30 minutes. The evaporant was outgassed at a current of 15 amps for over 2 minutes prior to deposition, which was performed at a current of 23 amps when using the evaporator for dielectric thin film evaporation.

Thus, per the example above, the polished aerogel substrate 20 of FIG. 2, having polished surface 22, is coated with a planarization layer 32 to provide a planarized substrate 30, as shown in FIG. 3 at section C.

The planarized substrate 30 is then coated with a reflective coating per the method of the invention as follows. In one example, planarized aerogel dielectric samples (PECVD or evaporated $SiO_2$ on polished aerogel substrate) were placed into an Edwards evaporator and aluminum and yttrium oxide MLD (Multi Layer Dielectric) Al/$Y_2O_3$ thin films were applied by deposition. The deposition conditions for the aluminum were: $2 \times 10^{-6}$ mbar, metal outgas at 10 amps with the shutter closed for one minute and depositing at a current of 15 amps for various times (1-3 minutes). The shutter was not opened until the deposition current was stabilized. Substrate temperature was, e.g. 30° C.

Figure 4:
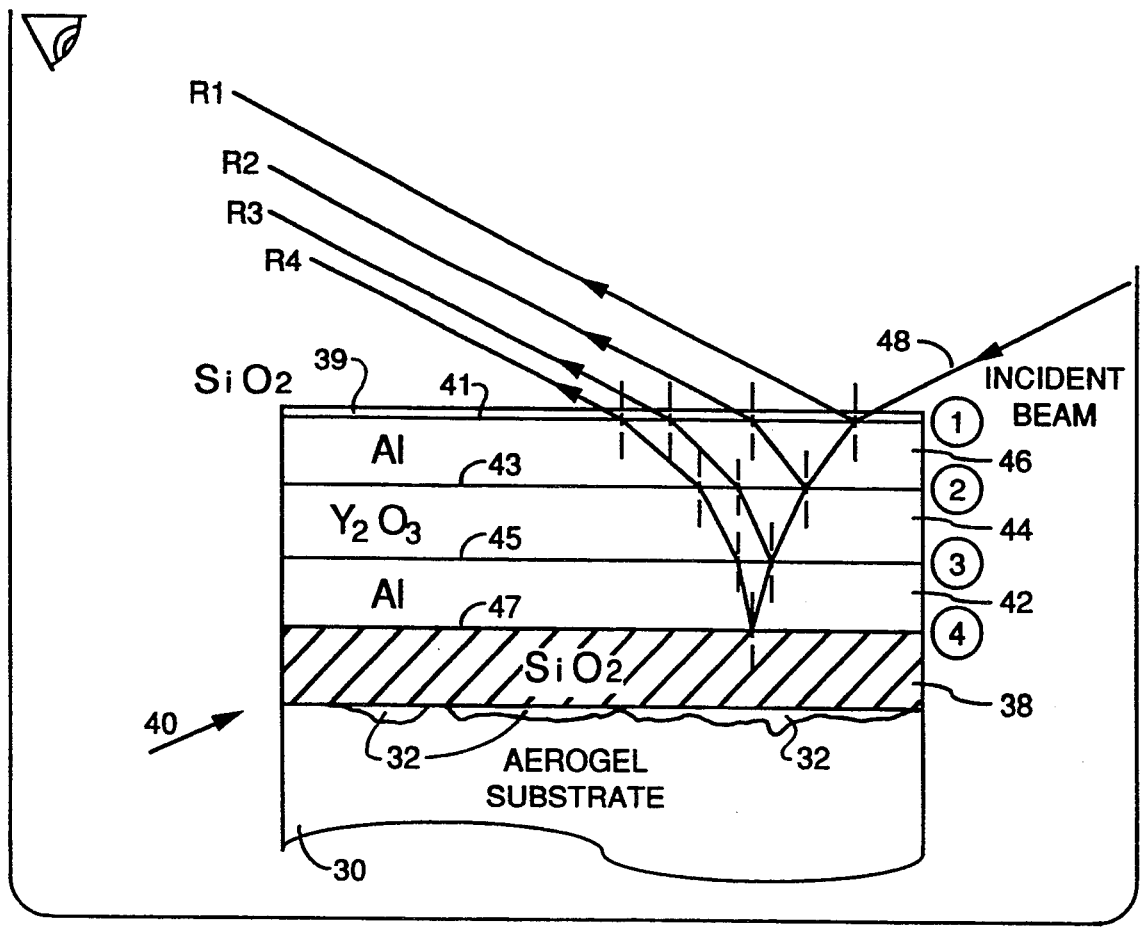
FIG. 4 is a sectional elevation schematic view of an aerogel substrate that has been polished, planarized and coated with reflective layers per the invention

Thus by the method of the present invention reflective coatings are deposited onto planarized aerogel substrates, which previously was thought to be very difficult if not impossible. The resulting LD aerogel MLD reflector 40 is shown in FIG. 4. Such reflector 40 has a polished aerogel substrate 30 coated with a planarization layer 32, surmounted by a dielectric layer 38 of $SiO_2$ and several transparent layers, e.g. layer 42 of Al, layer 44 of $Y_2O_3$ and layer 46 of Al, as shown in FIG. 4. Such layers present reflective surfaces (or interfaces) 41, 43, 45 and 47 to an incident beam 48, as shown in FIG. 4.

Preferably coated atop the last metal layer (Al) is a relatively thin coating 39 of $SiO_2$, which serves to protect the surface of the Al layer from oxidation (to, e.g. $Al_2O_3$) or further oxidation as the case may be, for improved reflectivity of such Al layer.

While the topmost AL surface 41 alone, can reflect, e.g. 60 to 70% of the incident beam, the remaining reflective surfaces below, reflect, e.g. 30 to 20% of the incident beam per FIG. 4, for a combined reflectivity of up to 90% or more, of the incident beam, e.g. per reflected rays R1, R2, R3 and R4 in such Figure.

The above layers 38, 42, 44 and 46 are advantagously thin films, as noted above. Desireably, the thin films have alternating high ($Y_2O_3$) and low (Al) indices of refraction for enhanced cumulative reflectivity at the surfaces (and interfaces) thereof. That is, the Al layer is higher in reflectance while the $Y_2O_3$ layer is higher in light transmissivity so that light reflectance and transmission occur at the interfaces of the respective layers 38 to 46, e.g. as indicated in FIG. 4.

Thus the method of the invention provides a significant advance in lowering the density of optics, e.g. reflectors. This permits larger optics to be deployed in space-based applications. Further, the way is open to merge LD aerogel substrates with various new coatings, to advance the state of the art in large optics technology.

Figure 5:
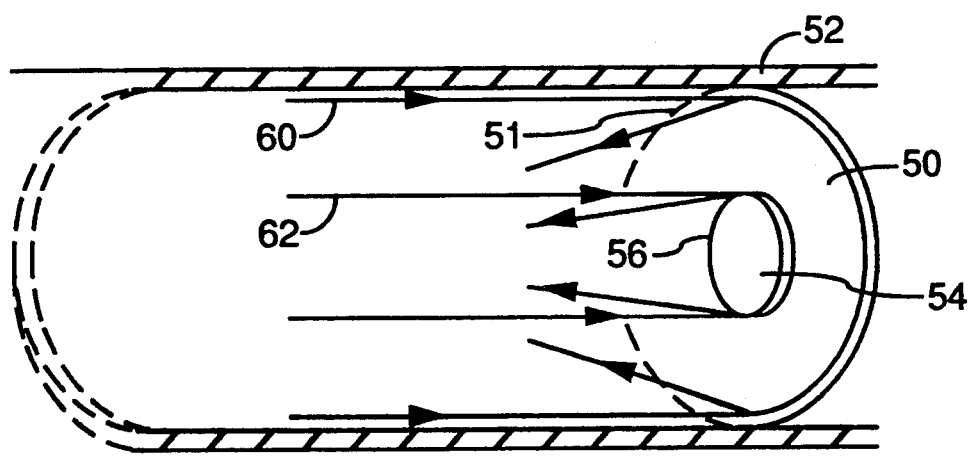
FIG. 5 is a sectional elevation schematic perspective view of a ULD aerogel reflector per the invention.

Thus an LD aerogel reflector (including mirror) 50 mounted to space-based telescope barrel 52 is shown in FIG. 5. Here the LD aerogel substrate has a density of between 10-500 mg/cc, permitting the launch on a space vehicle of a relatively large mirror within payload constraints. A prior art mirror, having a substrate made with current ULE glass technology, i.e. having a density of 2.2 gms/cc or 2200 mg/cc, fabricated into a mirror of comparable payload (or weight), is shown for comparison as mirror 54 having circumference 56 (and a diameter of e.g. 2.4 m), well within the dimensions of the LD aerogel mirror 50 of the present invention, having circumference 51 (and a diameter of, e.g. 20 m) as indicated in FIG. 5. Accordingly the LD aerogel reflector 50 has an area that is over 6 times larger than the prior art ULE glass mirror 54, though both be of the same (payload) weight.

The reflector of the present invention can be made from inorganic aerogels of, e.g. $SiO_2$, $SiO_3$, SiC, KCl and $Be_2O_3$. Such reflector can also be made of LD organic aerogels (in the presence of a catalyst) to obtain, aerogels of resorcinol-formaldehyde and melamine-formaldehyde.

In an example of preparing an organic aerogel, resorcinol and formaldehyde are mixed with a molar ratio of 1:2 in an appropriate amount of de-ionized and distilled water. Sodium carbonate is typically used as the base catalyst and the solution is poured into pyrex containers to cure for 7 days at 85°-95° C. The gel is then removed from the container and placed in a dilute acid solution. The gels are then placed into molds and mixed with an organic solvent. The gels are then put through the solvent replacement process (using liquid $CO_2$) as described above to form an organic aerogel that is a cross-linked polyner of resorcinol and formaldehyde. In a related process, melamine and formaldehyde are combined to form a cross-linked polymer that is processed as above, to form malamine-formaldehyde aerogel.

Various other inorganic and organic aerogels can be employed as the reflector substrate of the present invention. A preferred such aerogel is an LD silica aerogel.

The aerogel employed herein can have a density of from 10 to 500 mg/cc. However, for reflector applications it is preferred to employ aerogel substrates having densities between 80–450 mg/cc.

The aerogel substrate is polished as noted above with lapping paper in the presence of a dry inert gas. That is, an inert gaseous spray (e.g. freon, dry nitrogen or other dry inert gas) is applied to a lapping surface (e.g. of an aerogel substrate) while lapping or polishing is being performed. The spray cools and lubricates the aerogel as well as removing small pieces of aerogel from the lapping/polishing sheet so as to minimize or prevent damage to the surface being polished.

The lapping sheet can be of e.g. lapping paper, a plastic film which has been embedded with small chips of diamond or sapphire crystals and has a surface roughness of 64 to 1 microns, as noted above. This is the same lapping film used to polish fiberoptic cables after cleaving. It is an industry standard item.

As noted above it's possible to alleviate some or much of the lapping and polishing process by use of a precision mold in the aerogel formation process. However, some polishing thereof as described above, is still required.

As described above in the process of the present invention a dielectric planarization layer is then applied to the polished substrate by various methods including, a) Plasma-Enhanced Chemical Vapor Deposition (PECVD), b) thermal evaporation, c) sputtering, d) spin coating (or spray spinning) and e) other suitable film deposition techniques.

The planarization layer can be of a dielectric such as $SiO_2$, SiC and $Y_2O_3$.

For example, a planarization layer of $SiO_2$ was deposited by methods a) and b) above on polished substrate samples of silica aerogel.

Once planarized, reflective layers including coatings and films are applied or deposited by the above steps for applying the planarization layer, particularly by a) thermal evaporation or b) sputtering.

The reflective coatings can be a) a single component specie, e.g. a metal thin film or b) multi-component metal alloys used as front surface reflectors, e.g. multi layer metal alloy film(s) or c) front surface reflectors with over-coatings for mechanical protection of the metal film or for wavelength filtering or d) multi-layer dielectric (MLD) coatings used in Fabry-Perot coatings e.g. MLD/metal thin film(s) as in Al/$Y_2O_3$ coatings, as noted below .

In an example of a single layer reflector, one has an aerogel substrate (polished), planarized with an $SiO_2$ layer, which layer is coated with a reflective layer of Al, which in turn, is advisedly coated with a thin $SiO_2$ layer to protect the Al layer from oxidation.

In an example of an MLD reflector, a polished aerogel substrate, planarized with $SiO_2$, had an aluminum metal film reflective layer (Al) deposited thereon. Thereafter such aluminum mirror was over-coated with MLD Al/Y$_2$O$_3$ Fabry coatings and topped with a thin layer of SiO$_2$ to minimize or reduce oxidation of the surface of the top Al layer (to, e.g. Al$_2$O$_3$), e.g. as indicated in FIG. 4 hereof. Desirably there are 2 to 9 to 20 layers or more of such coatings that progressively can serve to increase the reflectivity of the reflector.

The above prototype reflectors were 40% to 87% reflective in the visible and IR bands, with low bidirectional scatter (the BRDF dropped by two orders of magnitude at angles away from specular).

Accordingly, the method of preparing the lightweight reflectors of the invention and the reflectors themselves can lower the density of optics including reflectors e.g. by up to one or more orders of magnitude. This permits larger optics deployable in space, e.g. for astronomy purposes, surveillance and other applications.

Possible alternative modes of the lightweight reflector of the present invention include large optics for surveillance on or near planet Earth, astronomical telescopes, geophysical and surveillance satellites, terrestrial and extra terrestrial planetary probe surveillance systems. Additionally, the ability to engineer the compliance tensor opens a possibility of utilizing a greater density heterostructure as a highly deformable substrate in large adaptive mirror applications.

The lightweight aerogel substrate of the invention can also be employed for small or medium sized optics applications as desired, within the scope of the present invention.

What is claimed is:

1. A lightweight low density aerogel reflector comprising,
    a) a substrate of low density aerogel at densities between 10–500 mg/cc,
    b) the surface of said substrate being polished,
    c) a dielectric planarization layer being vapor deposited on the so-polished surface and
    d) at least one reflective layer deposited on said planarization layer.

2. The reflector of claim 1 having a plurality of reflective layers deposited on said planarization layer.

3. The reflector of claim 1 wherein such aerogel substrate is organic or inorganic.

4. The aerogel reflector of claim 3 wherein said inorganic aerogel is selected from the group consisting of silica, KCl, Be and Be$_2$O$_3$ and said organic aerogel is selected from the group consisting of resorcinol formaldehyde and melamine formaldehyde.

5. The reflector of claim 1 having a planarization layer selected from the group consisting of SiO$_2$ and SiC.

6. The reflector of claim 1 wherein said reflective layer is one or more selected from the group consisting of a) a single component metal specie, b) a multi-component metal alloy used as a front surface reflector, c) a front surface reflector with protective over-coatings and d) a multi-layer dielectric (MLD) coating as used in Fabry-Perot coatings, including MLD Al/Y$_2$O$_3$ coatings.

7. The low density aerogel reflector of claim 1 being employed as a space-based reflector.

* * * * *